United States Patent [19]
Hoyt

[11] Patent Number: 5,953,087
[45] Date of Patent: Sep. 14, 1999

[54] APPARATUS FOR STRESS RELIEVING LIQUID CRYSTAL DISPLAYS

[75] Inventor: Clifford C. Hoyt, Needham, Mass.

[73] Assignee: Cambridge Research & Instrumentation Inc., Cambridge, Mass.

[21] Appl. No.: 08/838,625

[22] Filed: Apr. 11, 1997

[51] Int. Cl.6 ................................................ G02F 1/1333
[52] U.S. Cl. .................. 349/58; 349/20; 349/60; 349/84; 349/153; 349/154; 349/158
[58] Field of Search .................. 349/20, 58, 60, 349/84, 153, 154, 158

[56] References Cited

U.S. PATENT DOCUMENTS

| | | | |
|---|---|---|---|
| 3,771,855 | 11/1973 | Burns | 350/160 |
| 3,881,808 | 5/1975 | Gurtler et al. | 350/160 |
| 4,256,382 | 3/1981 | Piliavin et al. | 350/334 |
| 4,310,220 | 1/1982 | Kuwagaki et al. | 350/357 |
| 4,385,806 | 5/1983 | Fergason | 350/347 |
| 4,408,839 | 10/1983 | Wiener-Avnear | 350/347 |
| 4,436,379 | 3/1984 | Funada et al. | 350/347 |
| 4,448,489 | 5/1984 | Sato et al. | 350/330 |
| 4,466,702 | 8/1984 | Wiener-Avnear et al. | 350/347 |
| 4,497,542 | 2/1985 | Kaye | 350/335 |
| 4,545,650 | 10/1985 | Kirkman et al. | 350/357 |
| 4,582,396 | 4/1986 | Bos et al. | 350/347 |
| 4,583,825 | 4/1986 | Buzak | 350/335 |
| 4,682,858 | 7/1987 | Kanbe et al. | 350/334 |
| 4,770,500 | 9/1988 | Kalmanash et al. | 350/347 |
| 4,832,460 | 5/1989 | Fujimura et al. | 350/346 |
| 5,126,866 | 6/1992 | Yoshimizu et al. | 359/63 |
| 5,126,868 | 6/1992 | Kizaki et al. | 359/86 |
| 5,175,638 | 12/1992 | Kanemoto et al. | 359/73 |
| 5,187,603 | 2/1993 | Bos | 359/73 |
| 5,221,978 | 6/1993 | Heynderickx et al. | 359/53 |
| 5,337,174 | 8/1994 | Wada et al. | 359/73 |
| 5,380,459 | 1/1995 | Kanemoto et al. | 252/299.01 |
| 5,400,158 | 3/1995 | Ohnishi et al. | 359/73 |
| 5,410,422 | 4/1995 | Bos | 359/73 |
| 5,440,413 | 8/1995 | Kikuchi et al. | 359/73 |
| 5,459,598 | 10/1995 | Carrington | 359/81 |

Primary Examiner—William L. Sikes
Assistant Examiner—Robert J. Hollingshead
Attorney, Agent, or Firm—Cohen, Pontani, Lieberman & Pavane

[57] ABSTRACT

A liquid crystal cell is described which includes adaptive means to relieve hydrostatic pressure and means for restraining the aperture portion of the cell, and which may be assembled together with thick members such as precision windows, or may be built into optical assemblies incorporating several cells placed optically in series, such as tunable filters or multiple-cell optical switches, without defeating the pressure-relief mechanism.

18 Claims, 7 Drawing Sheets

APPARATUS FOR STRESS RELIEVING LIQUID CRYSTAL DISPLAYS

FIELD OF INVENTION

The invention pertains to the field of liquid-filled display devices, and specifically for an apparatus for stress-relieving these devices against hydrostatic pressure such as may be generated by thermal expansion, contraction, mounting, assembly, or other sources.

BACKGROUND OF THE INVENTION

A liquid crystal display (LCD) consists of an optically active liquid contained within a cavity formed by two glass substrates held in close proximity. By applying an electrical signal thereto, the optical properties of the liquid crystal are altered, and this forms the well-known basis of the display action. There are a variety of techniques for applying and patterning suitable transparent electrode materials, along with the other thin-film coatings necessary for inducing proper operation of such devices, which are known in the art and will not be restated here. Such well known techniques are described in, for example, Badahur, *Liquid Crystal Displays* (Molecular Crystals & Liquid Crystals 109, 1 [1984]), which is incorporated herein by reference.

LCD substrates are typically joined using an adhesive seal at the perimeter of the display, after which the resulting cavity is filled with liquid and sealed to prevent contamination or leakage. The adhesive seal joins the substrates and defines a cavity in the space between them. This spacing determines the thickness of the liquid layer, and tight spacing control is critical to producing high-performance liquid crystal displays.

Thermal stresses arise because the thermal expansion of the liquid is several hundred times that of glass, leading to hydrostatic pressure when the display is thermally cycled. At high temperatures, the expanding fluid generates large pressures within the cell cavity. Since liquid crystal fluids are nearly incompressible, this expansion leads either to a deformation of the cavity, if the substrates are sufficiently flexible, or a failure of the adhesive seal if they are not. Similarly, when it is cooled, the liquid contracts, which can lead to cavitation, i.e. bubble formation.

It is common practice to construct displays using relatively thin glass substrates (0.5–1.1 mm) to provide the required flexure. Note that the spacing of the cell inevitably changes with temperature, which leads to diminished display performance. In general, cell spacing is not uniform across the display aperture when the cell is expanded or contracted.

Sometimes, thick substrates must be used. For example, when LCDs are used as precision optical components, substrates of 3 mm thickness or more are employed, to achieve good flatness ($\lambda/8$ or better) across the display aperture.

Equivalently, displays are sometimes made from thin substrates to which thick, flat windows are bonded with optical epoxy. The incompressible nature of the fluid means that thermal expansion distorts thick substrates just as much as thin substrates. The main effect of greater substrate thickness is that higher pressures are developed within the fluid cavity. Accordingly, such a device has two problems: the adhesive edge seal is more likely to fail under the higher pressures developed, and the goal of achieving a precise optical figure is thwarted by the inexorable expansion of the fluid.

The same situation occurs when a liquid-based display cell is glued or bonded into an assembly with other cells or additional components. Even if the display itself is stress-relieved by use of thin substrates and avoidance of rigid spacer material, the device is rendered mechanically stiff by means of the other components it is bonded to. This stiffening frequently leads to failure of such assemblies, even though the components are reliable on their own, by rupture of the adhesive edge-seal.

In U.S. Pat. No. 4,310,220, Kuwagaki addresses this problem by incorporating a bubble of gas such as $N_2$ within the cavity region. To be acceptable, such a bubble must be excluded from the display viewing region, as it would constitute a cosmetic defect. This is a severe limit to Kuwagaki's method, as the presence of a stable bubble implies that there is dissolved gas in the liquid, in equilibrium with the bubble at near-atmospheric pressures. Since common atmospheric gases such as $N_2$ are soluble in liquid crystal materials and electrochromic electrolytes, this means the liquid must contain dissolved gas in significant quantities, which can lead to bubble formation at unpredictable locations in the display.

Burns, in U.S. Pat. No. 3,771,855, teaches the use of a glass washer and ultrathin (microsheet) glass disk to seal a liquid crystal cell. The glass washer is used as a spacer, to which the microsheet disk is epoxied. Sealing is carried out so as to leave a small gas bubble in the fill hole. Thermal stress relief is said to be provided by flexure of the seal members, although in practice the majority of the stress relief is due to the compliant gas bubble. This may be verified by direct calculation of the compliance of the bubble and of the seal members. In actual practice this method is quite similar to that of Kuwagaki. However, for the reasons just given, such a bubble is to be avoided in LCD displays, and an improved method of stress relief is desirable.

In U.S. Pat. No. 4,256,382, Piliavin et. al. describe a liquid crystal device which includes a silicon membrane layer between the substrates, patterned using semiconductor fabrication techniques. The layer purports to match the thermal expansion of liquid crystalline materials, and provide control of the spacing. Beyond the problem of the expense of such a silicon member, this invention suffers many limitations. For example, silicon has a thermal expansion coefficient only a small fraction that of liquid crystal fluid materials. Thus no meaningful thermal matching is provided. Another purported benefit is that the patterned membrane excludes liquid crystal material from optically unused areas, reducing the volume of expanding material. However, since silicon is nearly incompressible, no benefit accrues. Similar detrimental high pressures are developed, albeit in a reduced volume. Displays made in accordance with Piliavin's invention will not have reduced thermal stress, relative to displays without the spacer membrane, and will be prone to cavitation at low temperatures due to the stiffness of the spacing control.

Another approach is taken by Kirkman et. al. in U.S. Pat. No. 4,545,650, who describe a liquid eletro-chromic (LEC) cell assembly with a total of at least thirteen separate parts, several of which have complex shapes and require machining and/or close-tolerance molding to produce. It uses a fluorocarbon polymer membrane to provide a flexible means to accommodate the thermal expansion and contraction of the liquid. This membrane is installed after filling the display with fluid, and is held in place by means of an annular washer and eccentric cam clamping pin. Aside from the cost involved, this system is bulky and is incompatible with industry-standard techniques for filling and sealing displays.

In U.S. Pat. No. 4,832,460, Fujimura et. al. teach a method for stress-relieving a liquid crystal cell comprising a linear array of optical shutters. Such cells are generally long and narrow, so the substrates form a stiff enclosure which cannot deform to accommodate volumetric changes in the fluid, causing undesirable areas of high localized pressure in the device. Fujimura describes how a cell can be made with additional liquid crystal regions formed by the substrates, not used optically but connected to the display aperture region, which act as pressure relief chambers for the fluid. These regions are much larger and wider relative to, and accordingly by virtue of their much larger relative size are more flexible than, the small and narrow shutter regions. The large pressure relief chambers are thus able to deform to a greater extent than the shutter region to accommodate volumetric changes which may arise in the liquid crystal material. Such a method only works when uniformly thin substrates are used, typically 1.1 mm or less, and the difference in size between the display aperture region and pressure relief region is great. Also, if several such elements are stacked together to form a multi-layer assembly, adjacent elements contact one another and pressure relief is defeated, since such contact prohibits necessary expansion of the pressure relief region.

Thus there exists a need for a device which solves the aforementioned shortcomings of the prior art.

SUMMARY OF THE INVENTION

The present invention relates to an apparatus for stress relieving liquid crystal cells with precise control of cell spacing over a wide thermal range. It enables one to make relatively thick-walled cells with precise optical figure, or to make assemblies containing thick members, or to make systems with several cells assembled optically in series, none of which suffer from deformation or high pressure when thermally cycled. The result is a rugged, precision liquid crystal cell which may be used on its own or in an assembly.

The present invention provides a liquid crystal cell with at least two zones, i.e. a display aperture zone that is connected to an auxiliary or adaptive zone by a fluid communication channel. The channel permits movement of liquid crystal material between the two zones as pressure conditions warrant. The spacing between substrates which forms the display aperture volume within which the liquid crystal material is held is tightly controlled by rigid restraining elements formed by the substrates in the display zone or by members externally affixed to the substrate in the display zone, while no such restraint, or significantly less restraint is applied to the auxiliary or adaptive zone, thus affording the required expansion or contraction of the auxiliary zone. This ability of the adaptive zone to adapt its volume in response to changes in the liquid crystal pressure, while the display aperture zone volume is restrained, affords pressure relief for the entire cell. As used herein, the term pressure relief is intended to include expansion of the adaptive zone in response to a volumetric increase in the liquid crystal material, as well as contraction of the expansion zone in response to a volumetric decrease in the liquid crystal material, regardless of how such volumetric variation is induced.

The novel cell herein described is typically constructed using thin substrates to achieve pressure relief in the auxiliary zone. To this cell is bonded an optically transparent member or members, using an optical adhesive. The transparent member covers the display aperture zone and preferably the entire seal adhesive which forms its perimeter, but does not fully extend over the auxiliary zone. By virtue of its controlled shape and unyielding construction, the transparent member restrains the display aperture zone from changing shape in response to changes in volume of the liquid crystal, yet does not defeat the pressure relief effect of the auxiliary zone, nor create detrimental high localized stress anywhere in the cell. Pressure relief is considered display adequate where the geometry and volume of the aperture zone remain within suitable limits for the designed application over the expected range of volumetric variance of the liquid crystal material. While such parameters will likely vary on an application by application basis, such parameters are readily calculated by the routineer in the art.

A window may then be attached to the transparent member without defeating the pressure relief. In this way, the invention enables construction of individual cells with thick windows having precise, thermally-stable optical shape. If the shapes of the various components permit, the window can itself function as the transparent member.

Because of the presence of this member, several such cells may be joined with optical adhesive, forming an assembly wherein the display aperture regions are stiffened thereby, and the pressure-relief auxiliary zones of adjacent cells do not interact or interfere with one another since the member forms a spacer between adjacent cells. In this way, the invention enables construction of assemblies of several such cells, all of which are pressure-relieved. The overall assembly may have thick windows if desired, without defeating the pressure-relief. Moreover, other optical devices and/or windows may be joined to single such cells, or interposed or interleaved between a plurality of such cells, with the devices acting as spacers and/or the requisite restraining members, as discussed and described further herein.

Here and throughout, the term transparent means that there is sufficient optical transmission for light of at least a selected polarization state to meet particular application requirements, as a matter of design choice. By way of non-limiting example, glass, optical retarder elements, and optical polarizer elements, other types of liquid crystal cells, are all considered to be transparent for this purpose, as is any member of known physical thickness which transmits light of at least a desired polarization state. The restraining member is intended to include any optically transparent means for restraining the display aperture zone from varying in geometry and/or volume in response to pressure, including localized variations in the thickness of the substrate.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DESCRIPTION OF THE DRAWING FIGURES

In the drawings, which are illustrative and not to scale, and wherein like reference numerals denote like elements throughout the several views.

DESCRIPTION OF THE PREFERRED EMBODIMENTS

Figure 1:
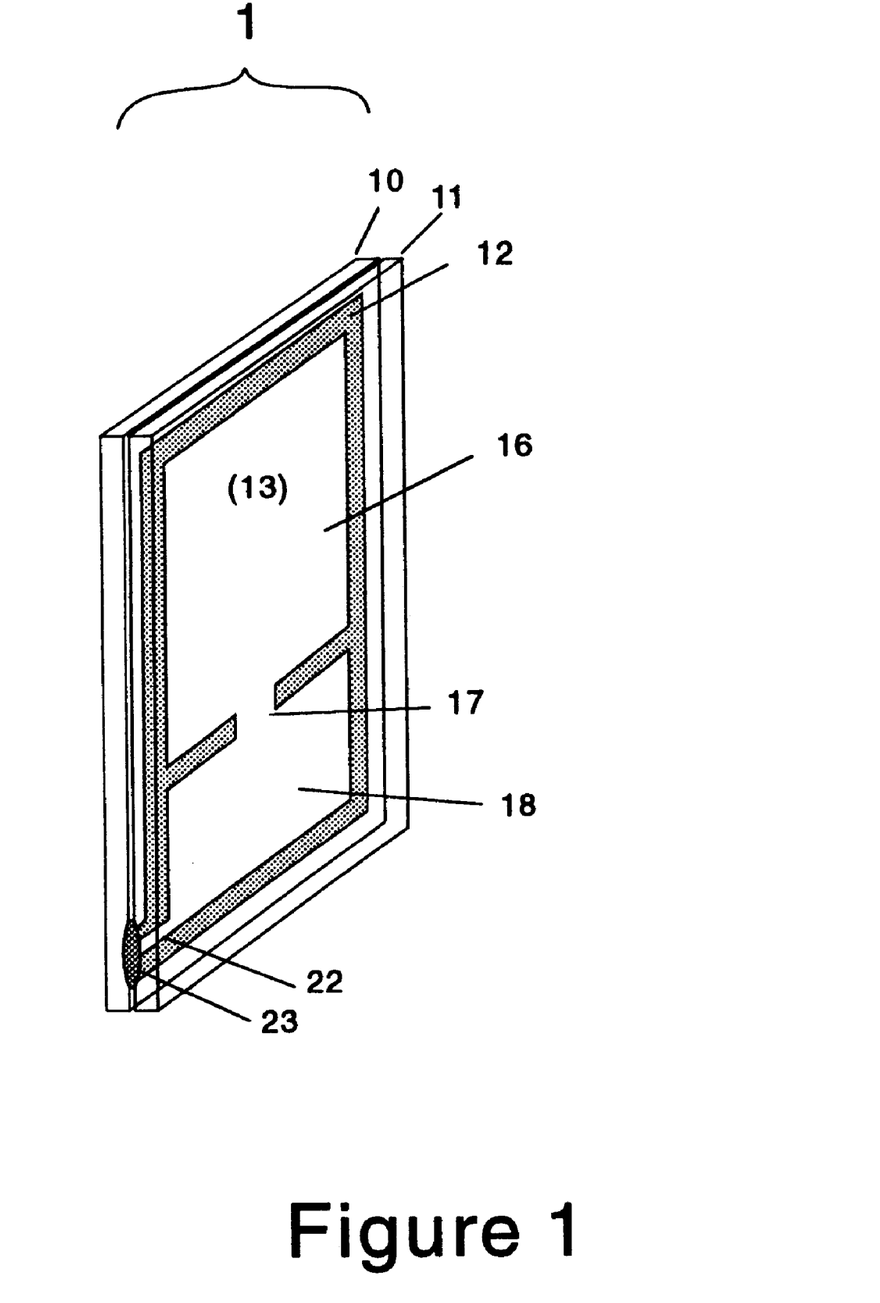
FIG. 1 is a perspective view of a pressure relieved liquid crystal device in accordance with the present invention, absent restraining means for clarity.

A cell constructed in accordance with the present invention is shown in FIG. 1. Substrates 10 and 11 are bonded together with a predeterminately shaped bead or strip of sealing epoxy 12, which forms an enclosed cavity which receives and contains a volume of liquid crystal material 13 between the substrates 10, 11. Bead 12 maintains the substrates 10, 11 a desired distance apart while securing them together, in an art recognized manner, or bead 12 may simply maintain the distance between the substrates as the substrates are secured together by other means. After filling the cavity with fluid by means of fill hole 22, the cell is sealed with sealing epoxy 23, in an art recognized manner not critical to, nor forming a part of the instant invention.

The substrates are generally relatively thin, generally in the range 0.4–1.1 mm thick, although the thickness chosen will vary as a matter of art recognized design choice. Transparent indium-tin oxide (ITO) electrodes (not shown) may be provided on the inner surfaces of the substrates to drive the liquid crystal cell, and these may be patterned or not, as desired for a given use. The inner surfaces may be further treated to create a particular alignment of the liquid crystal material, by means of a buffed polymer alignment film or other industry-standard method not forming a part of the instant invention.

The shape of the cell 1, and in particular the shape configuration of the seal formed by the epoxy bead 12, is chosen to create two distinct portions or zones joined by a fluid communication channel or passage 17 through which liquid crystal material 13 can flow to equilibrate pressure in the two regions. The first portion is an display aperture region 16, is formed with the shape and dimensions determined by the optical requirements which the cell must serve, as a routine matter of design choice. It is connected by channel 17 to the second portion, i.e. an adaptive pressure relief reservoir 18, which may form an optically operative part of the cell 1, or may only exhibit limited optical performance. Taken together, the display aperture region 16 and the adaptive region 18 form the portions of interest for the liquid crystal cell 1 of the present invention, it being recognized that other components may and generally do form additional parts of an LC cell, such as electrodes, other substrate portions, etc. These and other art-recognized subcomponents, however, do not form a critical part of the instant invention, nor do they hinder the operative scope of the invention if used as part of the inventive cell herein described.

Figure 2:
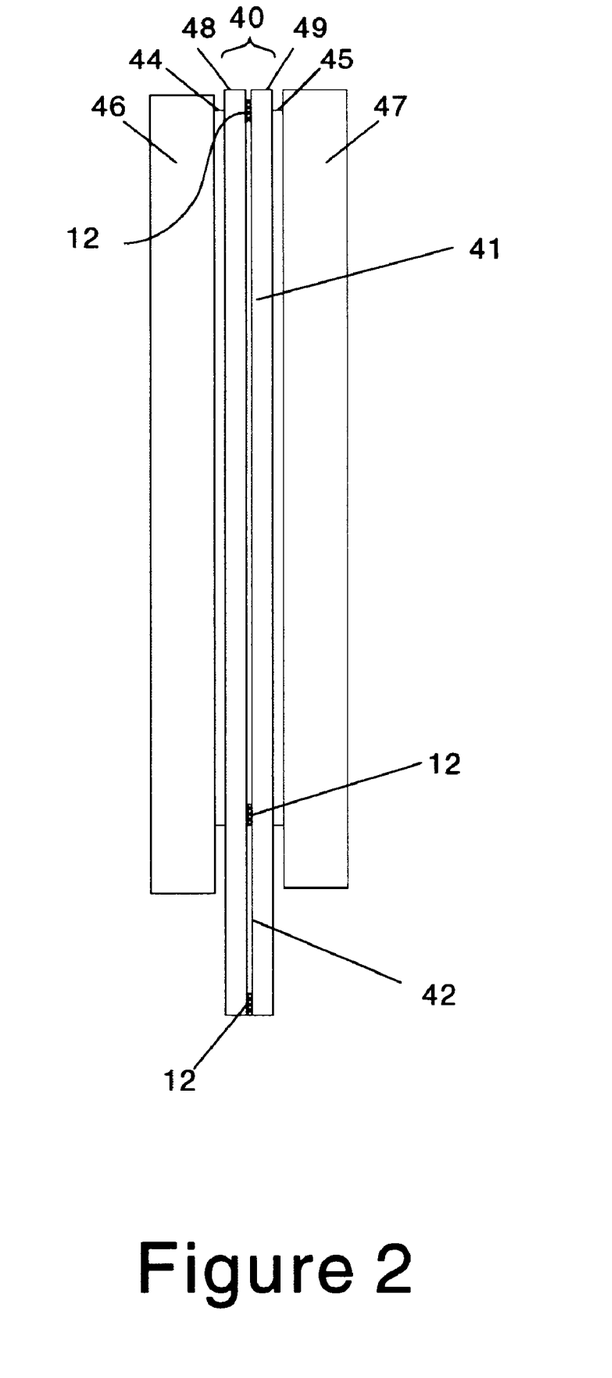
FIG. 2 is an illustrative side view of a pressure relieved liquid crystal device in accordance with the present invention, depicting restraining means on the display aperture.

With reference to FIGS. 1 and 2, an assembly is shown in perspective and side view, respectively, comprising a single cell with thick precision windows 46, 47 and incorporating pressure relief for expansion or contraction of the liquid crystal fluid 13. Cell 40 is constructed similarly to typical cell 1 just described, and includes two substrates 48 and 49, joined with an edge-seal adhesive 12 which is formed to create display aperture region 41 and adaptive region 42, connected by a channel 17 (not seen in FIG. 2) which permits equalization pressure between portions 41, 42 in accordance with Pascal's principle. Transparent spacer members 44 and 45 are joined to cell 40 bonded with optical adhesive, and have a shape chosen to cover the display aperture region without significantly extending into the adaptive region 42. Further bonded to these are precision windows 46 and 47, which, by virtue of their thickness, have significant stiffness as compared to the lower stiffness of adaptive region 42. The windows 46, 47 are so constructed as to not yield to volumetric changes in the liquid crystal material 13, as a result of their being bonded to the display aperture region 41 restrain the display aperture region from varying in geometric shape or interior volume as the liquid crystal volume changes. Spacer members 44, 45 form means which permits adaptive portion 42 to expand in an unrestrained manner in response to changes in volume of liquid crystal material 13 without contacting windows 46, 47.

In FIG. 2 the windows 46, 47 are shown as being larger in shape than the spacer members 44 and 45, as well as having greater thickness. Thus, a portion of each window overhangs the edge of the associated spacer layer 44, 45, respectively. This permits, by way of non-limiting example, circular precision windows to be used with a cell having a square or irregularly-shaped display aperture region.

Thermal expansion in both the display aperture region 41 and the adaptive region 42 contribute to an overall volumetric expansion in the liquid crystal material 13, which is taken up or equalized by deformation of thin substrates 48 and 49 in the adaptive region 42. As pressure or thermally induced volumetric change occurs in the liquid crystal material 13, there is substantially no change in the geometric shape of the precision windows, nor in the volume between the thin substrates 48, 49 which are restrained by the windows, nor of the liquid crystal layer itself, in the display aperture region 41.

It will of course be recognized that the means by which the display aperture portion may be stiffened or restrained is not limited to the above described mounting of restraining members such as thick windows 46, 47. The restraining element may be any number of a variety of sufficiently unyieldable optical elements or members, such as, by way of non-limiting example, spacers, windows, retarders, polarizers, other liquid crystal cells of the inventive variety described herein or otherwise, partially thickened substrates in the display aperture region, or a thick substrate forming one side of the cell and stiffening both regions in combination with any of the aforementioned elements mounted to or forming only the display aperture region of the opposing substrate. All of the above, and their art-recognized equivalents, are deemed encompassed within scope of the present invention.

Figure 3:
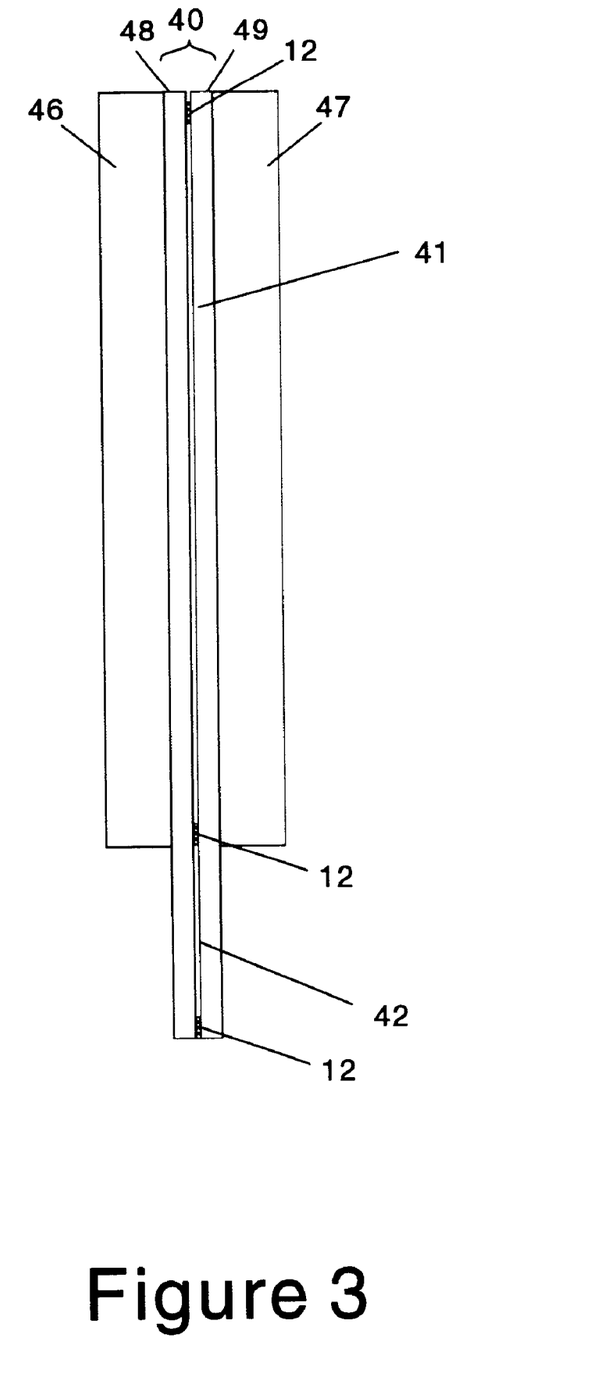
FIG. 3 is an illustrative side view of a pressure relieved liquid crystal device in accordance with the present invention, depicting another example of restraining means.

With reference to FIG. 3, an assembly is shown in side view wherein the precision windows 46 and 47 have a size and shape which permits them to perform directly as the restraining member without need for transparent spacer members such as those pictured in FIG. 2 as 44 and 45.

Figure 4:
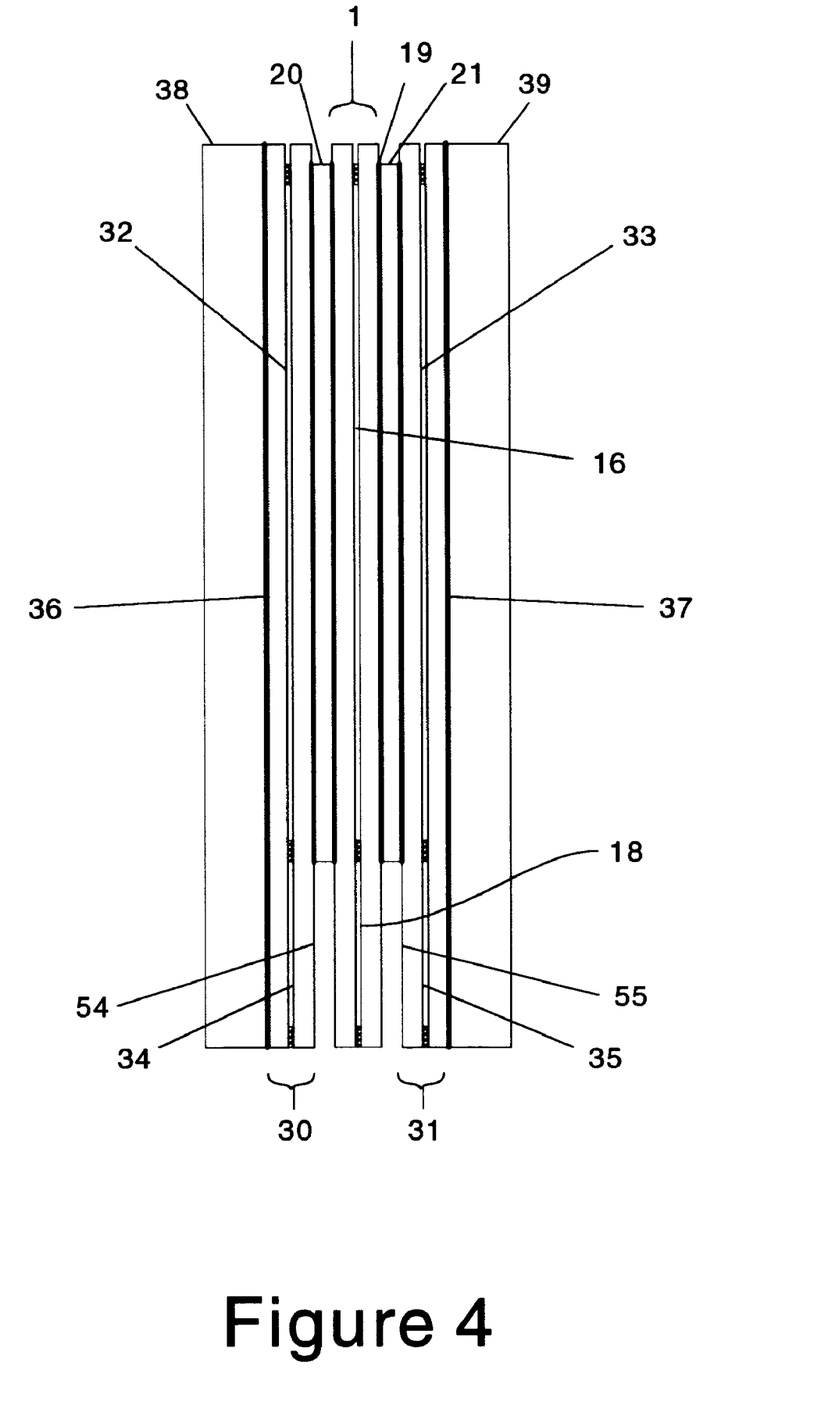
FIG. 4 is an illustrative side view of a plurality of pressure relieved liquid crystal device in accordance with the present invention, depicting multiple alternate restraining means, and restraining means on the outermost liquid crystal devices.

An assembly of cells according to this invention is pictured in FIG. 4, in side view, which includes an exemplary plurality of cells 1, 30 and 31. Typical cell 1, as described earlier, is bonded on both sides by optical adhesive 19 to transparent spacer members 20 and 21, which cover the display aperture region and extend over the width of the associated epoxy bead 12 which forms the perimeter of the display aperture region 16 of the cell 1. The means do not extend over the channel or passage 17, nor do they cover the adaptive region 18. The thickness $T_{SM}$ of the transparent spacer members need not be great: 0.002" would be sufficient, although in practice these members will be many times this thick because of the practical concerns of cost, and the difficulty in handling such thin parts without breakage. Spacers 20, 21 form the means by which the adaptive regions 18, 34 and 35 are prevented from contacting each other in the event of expansion of the adaptive regions.

To these spacers are bonded additional liquid crystal cells 30 and 31, identical to cell 1 and having like-shaped display aperture regions 32 and 33, along with adaptive regions 34 and 35. Due to the spacer members 20 and 21, the adaptive regions 18, 34, and 35 are free to expand without interference from one another, until a total expansion of $T_{SM}/2$ is achieved and contact occurs. Contraction occurs without interference until the opposed substrates of a given cell make contact with one another. For practical cells, neither of these conditions will occur. If the display aperture region is undeformed, volumetric expansion in the adaptive region is given by:

$$\delta V = \gamma \cdot \delta T \cdot V_{total} \quad [1]$$

while the area of the adaptive region is:

$$A_{pr} = k \cdot A_{total} = k \cdot V_{total}/d, \quad [2]$$

where:
  γ is the thermal coefficient of expansion for the fluid,
  δT is the shift from the temperature at which the cell was sealed,
  k is the ratio of adaptive region area to total cell area,
  d is the thickness of the liquid crystal layer at pressure equilibrium.

From these equations, we see that the adaptive region will deform by an amount given (approximately) by:

$$\delta d = \delta V/A_{pr} = [\delta T \cdot \gamma \cdot d]/k. \quad [3]$$

For liquid crystal fluids, γ≈0.004. Thus, for a cell with k=0.2, the deformation is d/50 per ° C. Typical values for d range from 3–15 μm, so the total deformation is quite small. Thus, spacer members 20 and 21 need not be thick. A thousandth of an inch is enough that the deformation be unimpeded, so large pressures are not developed within the expanding fluid. In practice, significantly thicker spacer layers are generally used for economy and to prevent damage in handling and assembly. Spacers 20, 21 may be implemented as transparent glass spacers, or may be any number of optical devices which perform the spacing function as well as an optical function, such as, by way of non-limiting example, windows, retarders, polarizers, other liquid crystal cells of the inventive variety described herein or otherwise, partially thickened substrates, or other art recognized optical device used in liquid crystal-based component systems of the type described herein.

Referring once again to FIG. 4, outer substrate surfaces 36 and 37 of cells 30 and 31 are bonded to thick windows 38 and 39, preventing flexure at these surfaces. Expansion of the fluid in these cells must be accommodated by the inwardly facing substrate portions 54, 55 of the adaptive regions 34 and 35. As FIG. 4 illustrates, in certain applications it may be sufficient to provide flexure on a single surface of the adaptive region for each cell, provided that the stiffness of the aperture region of the cell greatly exceeds the stiffness of the adaptive region. Permitting flexure on both surfaces is beneficial, to the extent that it results in a reduced stiffness for the adaptive region, but it is not essential. Economy or other factors may dictate this depending on the particular application.

Figure 5:
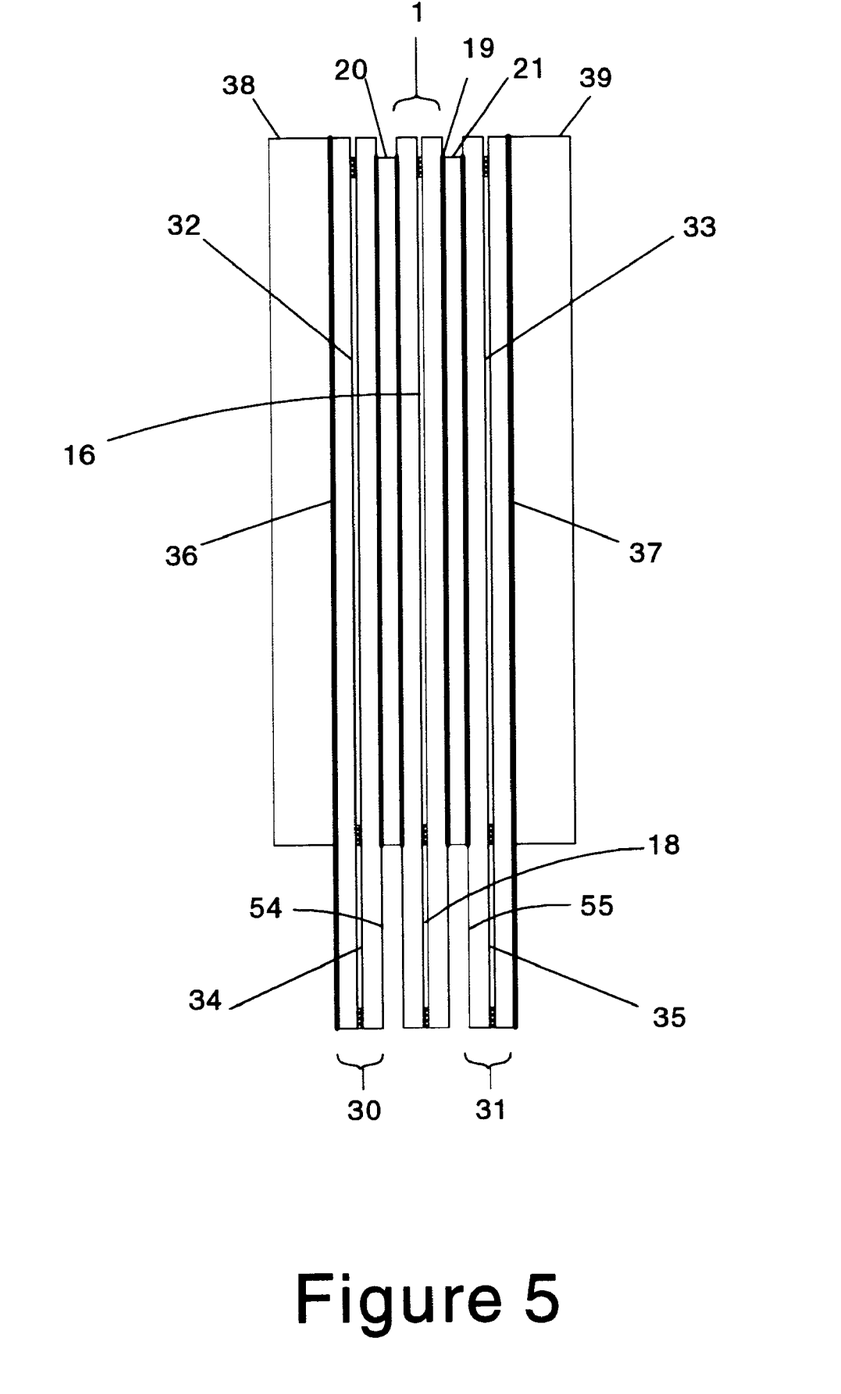
FIG. 5 is an illustrative side view of a plurality of pressure relieved liquid crystal device in accordance with the present invention, depicting multiple alternate restraining means, and restraining means on the display aperture of the outermost liquid crystal devices.

FIG. 5 depicts a similar plurality of cells to that depicted in FIG. 4, although the thick windows 38 and 39 have a predetermined shape which is chosen to permit flexure of both opposing surfaces of the adaptive regions 34, 35 of cells 30 and 31, respectively, while restraining the display aperture regions 32 and 33 of these cells from flexure.

Figure 6:
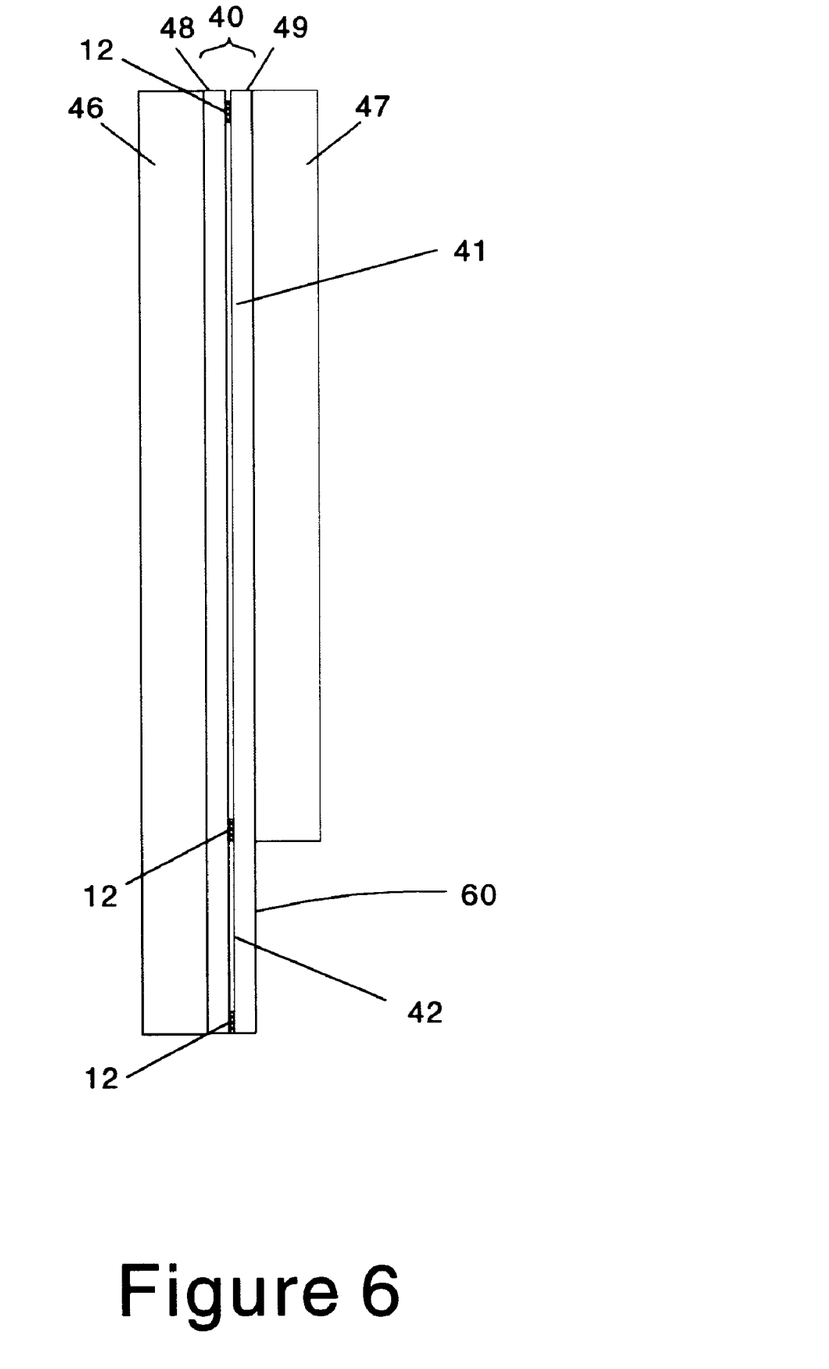
FIG. 6 is an illustrative side view of a pressure relieved liquid crystal device in accordance with the present invention, depicting restraining means on the display aperture of one side and on the entirety of the other side.

FIG. 6 illustrates a side view of a cell 40, of like construction to cell 1, to whose substrates 48 and 49 there are affixed thick windows 46 and 47 which restrain its display aperture from flexure. The adaptive region 42 of cell 40 accommodates volumetric change in the liquid crystal material of the cell, by flexure of the unrestrained substrate portion 60 of adaptive region 42.

Figure 7:
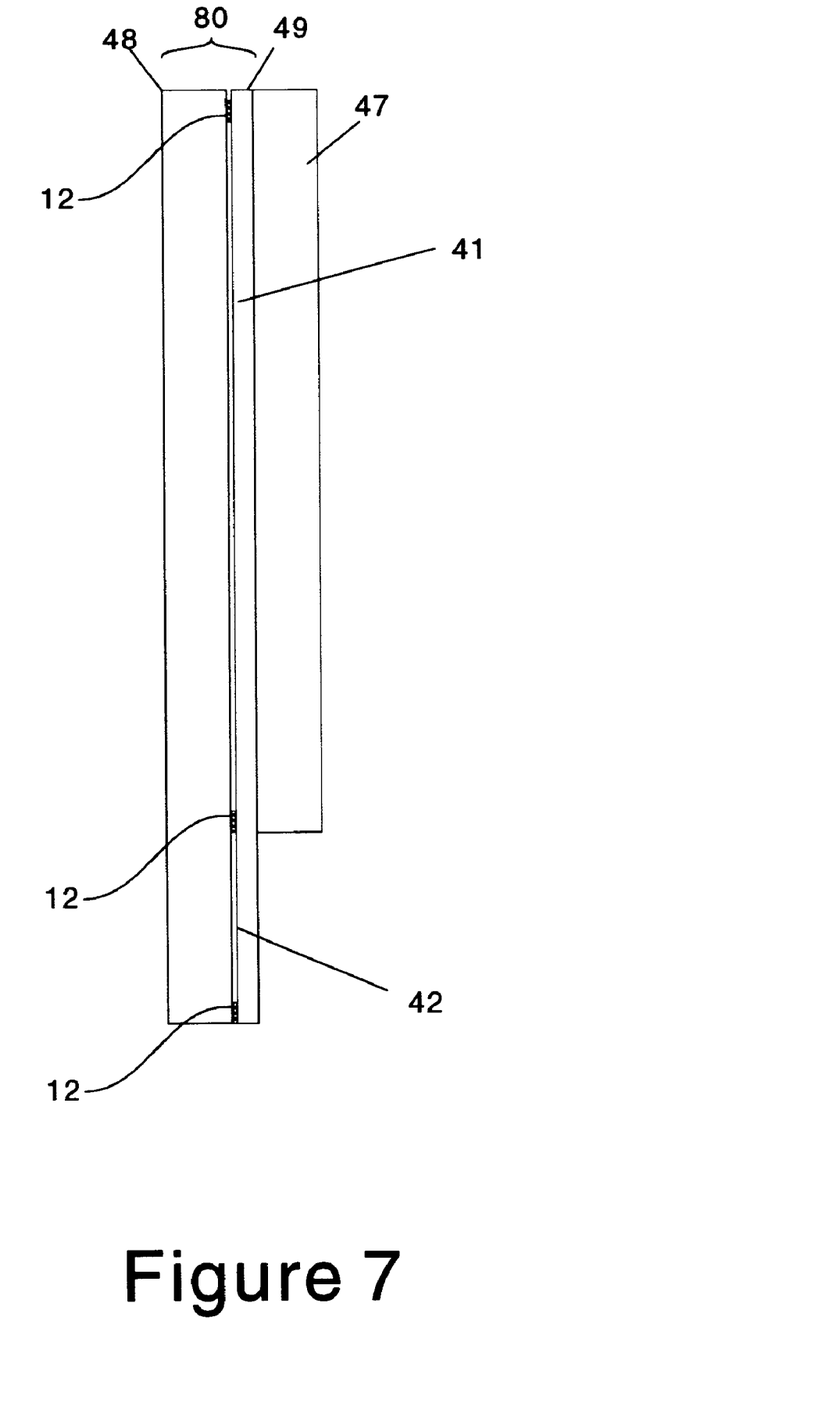
FIG. 7 is an illustrative side view of a pressure relieved liquid crystal device in accordance with the present invention, depicting a substrate on one side which forms its own restraining means, and depicting restraining means on the display aperture of the other side.

FIG. 7 illustrates a side view of a cell 80 comprised of substrates 48 and 49 and having an display aperture region 41 and an adaptive region 42. It is of like construction to cell 1 in FIG. 1, except that substrate 48 is thick and thus is stiff as a result. Thick substrate 48 functions to restrain one side of the display aperture region 41 from flexure, the other side being restrained by a thick optical window 47. This window has a predetermined shape which is chosen to cover the display aperture region 41, but not to interfere with flexure of the adaptive region 42. Thus, the adaptive region is able to accommodate volumetric change in the liquid crystal material in the cell.

For each of the above-described embodiments of liquid crystal cells in accordance with the present invention, this invention may be practiced on liquid crystal cells which incorporate nematic, smectic, or cholesteric materials; the principles are identical. Also, all examples describe expanding liquid crystal material, that is, cells at an elevated temperatures relative to the equilibrium temperature at which the liquid crystal cavity was sealed. Of course it will be recognized that the same benefits apply at reduced temperatures, with the difference that members previously in tension are then in compression and vice versa. The invention is also applicable to configurations where changes in liquid crystal volume are induced by other than temperature change, such as for example by ambient pressure changes.

As illustrated in the drawings above, the invention can be used to manufacture assemblies of pressure-relieved cells, or to attach thick optical elements such as windows to liquid crystal cells while still providing pressure relief. In addition to optical windows used as stiffeners or spacers, as discussed above this invention is effective with optical retarders, which may be made of, for example, quartz, calcite, $LiNbO_3$, and the like. This has the special benefit that these materials are principally used in polarization-sensitive equipment, in which the presence of strain-induced birefringence would constitute an unwanted defect. The present invention, by removing pressure or reducing it to practical insignificance, eliminates the strain which causes this defect.

One of the design parameters considered by one skilled in the art in constructing liquid crystal displays in accordance with the instant invention is the relative stiffness of the restrained display aperture region as a result of or together with the mechanical system comprising the spacer member and all other attached elements and/or cells, compared to that of the pressure-relief region. This dictates which region accommodates which proportion of the expansion, in accordance with Pascal's principle that in the hydrostatic approximation, pressure is equal throughout a fluid. The pertinent stiffnesses of the regions of interest can be calculated for some simple cases, such as circular or square regions apertures, by presuming some boundary condition at the edge. However, it is more accurate and more convenient to use a commercially available finite-element computer program such as NASTRAN, from MacNeal, Schwendler Corp., to determine these stiffnesses for the actual geometry and materials involved. This is based on conventional mechanical engineering techniques known to those skilled in the art, such as described by e.g. R. D. Cook in *Concept and Application of Finite Element Analysis*, (Wiley & Sons, NY [1989]).

Models resulting from application of the known mechanical engineering techniques show that there are regions of localized stress at the perimeter of the display aperture region, which are exacerbated if the spacer member does not extend over the majority of the seal epoxy bead that joins the two substrates and defines the display aperture region. To prevent this, the spacer member should extend over the full display aperture region and at least the majority of the seal epoxy bead. Similarly, if a thin spacer member is used, and it extends into the pressure relief region, expansion in this region leads to high localized stress that can damage the spacer where it extends into the expanding pressure relief region. This situation is to be avoided. For similar reasons, the excess epoxy should be minimized in assembling the various components. If present in unwanted locations, it can defeat the purpose of the spacer member, or can generate localized stress. Excess adhesive which yields a meniscus of 0.005" at the perimeter when cured is acceptable.

With these stiffnesses and the total fluid expansion volume estimated from Equation [1] above, one can determine the total deformation strain in the display aperture region. This can be checked against the target value, such as the maximum permissible optical wavefront distortion error for a window, or the strain above which an element would display unacceptable birefringence, or which would correspond to an excessive variation in liquid crystal layer thickness across the display aperture. These numbers derive from the application specific optical system being developed, as determined by its design and performance requirements. After reviewing and comparing the actual deformations against the permissible values, one may alter the relative sizes and/or shapes of the display aperture and adaptive pressure relief regions. Increasing the relative size of the adaptive pressure-relief region will reduce the strain in the display aperture region, while decreasing it will allow a more compact construction, at the cost of increased deformation.

Beyond the considerations of relative stiffness, there is a concern that the absolute pressure level within the cell be kept low, so component members, especially the adhesives, do not fail catastrophically. For a given anticipated fluid expansion, the pressure scales directly with the net stiffness of the cell—which is the parallel combination of the stiffness of the display aperture and pressure relief regions. Thus, while the relative stiffness of the two determines which region is more greatly deformed, the absolute stiffness of the two (in parallel) determines the maximum hydrostatic pressure which is developed. This must be compared against failure strengths of the adhesives, which as presently known in the art range approximately 2000 psi or less, to determine whether the resulting system will be reliable. To reduce the peak pressures involved, one can use thinner substrates, or allow expansion of both sides of the adaptive pressure relief region as shown, for example in FIGS. 2, 3 and 5, or increase the size of the pressure relief region. The best performance, i.e. lowest stiffness, is achieved for adaptive pressure relief regions with approximately 1:1 aspect ratios, such as circles or squares, rather than extended rectangular or elliptical regions.

It is worth noting that when a plurality of cells are built into an assembly with windows and/or other elements, the impedance of the display aperture region differs for the various members in the assembly. This is most easily analyzed using numerical, computer methods, as described above.

It is sometimes possible to combine the function of the transparent spacer member and/or restraining member with that of another element such as e.g. a window, or retarder, or polarizer element. This requires that the element have an appropriate shape to function as a spacer; namely, that it cover the display aperture region and at least the majority of the edge-seal adhesive, while not extending into the pressure relief region.

When a transparent spacer element is employed, pressure relief of a multiple-cell assembly is obtained regardless of whether the pressure-relief regions of adjacent cells are adjacent one another or are widely separated. That is, the pressure relief region of a given cell might be located to one side of the display aperture region, while in the adjacent cell the pressure relief region is located on the opposite side of the display aperture region. Freedom from interference between pressure-relief members is obtained by means of the transparent spacer, which separates them by the amount of the spacer thickness. The decision to situate the pressure relief regions of adjacent cells so as to be superimposed with one another or not, is a design decision which may be made in each case according to available space, mounting considerations, and other factors.

One exemplary embodiment constructed according to this invention is a variable retardance electrically controllable birefringence (ECB) nematic liquid crystal cell with precision windows for use in laser systems. It is constructed of two substrates of 0.028" thick borosilicate glass, such as Corning 7059 supplied by Corning Glass of Corning, N.Y.). These substrates also comprise transparent ITO electrodes, such as the vacuum-deposited ITO electrodes supplied by Donnely Applied Films Corp. of Boulder, Colo., to achieve a resistivity of 200 Ω/sq. On top of this is applied a 0.5 $\mu$m polyimide film, such as that supplied by Brewer Science, of Rolla, Mo., that is buffed in accordance with industry-standard techniques to produce alignment of liquid crystal molecules. Enough edge seal, such as UV-15 edge seal supplied by MasterBond of Hackensack, N.J., is applied to yield a seal of 0.1" width, and the two substrates are bonded to form a 7 $\mu$m thick cavity with predetermined shapes providing an display aperture region of 0.8 inch diameter and a pressure relief region of 0.25×1.0 inches. The cell is filled with a liquid crystal material such as ZLI-1132, as supplied by EM Industries of Hawthorne N.Y., and sealed at room temperature. Optical windows, such as those supplied by Virgo Optics of Port Richey, Fla., with a diameter of 1.0", a thickness of 3 mm, and an optical figure of $\lambda/10$ are attached with an optical grade epoxy such as Epo-Tek 302 epoxy from Epo-Tek of Billerica, Mass. The windows extend over the display aperture region and the edge seal, and simultaneously function as the transparent spacer and as a window. The resultant cell is rugged and may be exposed to a temperature range of −40 to +65 C. without thermal degradation or failure.

A second exemplary embodiment is a birefringent filter, constructed using a plurality of cells, generally in the range from 3 to 18 cells. Each cell is constructed as described above, except that liquid crystal material E-44, supplied by EM Industries of Hawthorne, N.Y., is used instead of ZLI-1132, to develop a greater retardance range. The birefringent filter comprises a number of stages, each of which contains a cell and a polarizer. Many of the stages also include a fixed retarder made of quartz, $LiNbO_3$, or polymer film, depending on the optical properties desired. This selection is made according to the established art of birefringent filters. In this embodiment, the fixed retarders and the polarizer are manufactured with an outer diameter of 1.0 inches. In every instance, the filter is a Lyot filter so there is at least one member (a polarizer) between any two cells, and there may be a fixed retarder as well. These act as transparent spacer members to separate the adjacent cells and permit the pressure relief regions to operate without interference or impediment, while also as having a desired optical action. In the context of the present invention, 'transparent' means 'permitting light to pass', albeit with a desired optical action being performed as well. Windows are attached to the external faces of the end-most cells, which establish a relatively higher stiffness in these regions and thus prevent distortion of the optical figure as the filter is heated or cooled. These are sized as in the previously described embodiment.

A third exemplary embodiment comprises similar members to the second embodiment, except that because the birefringent filter design is a Solc design, there is no polarizer interleaved between each pair of cells. For adjacent cells not having a polarizer therebetween, as determined by the optical design of the Solc filter, a transparent spacer is provided of 0.4 mm thick borosilicate glass, with a diameter of 1.0 inches. The result is a filter which is reliable in the face of thermal exposure from −40 to +65 C., because the pressure relief region in each stage provides a relatively low stiffness for expansion of the fluid, and it is not defeated as would be the case without appropriately-sized transparent spacer members. If filter thickness is at a premium, every second transparent spacer member may be omitted. This means that each cell has one substrate which is free to expand in the pressure-relief region, and one substrate which may not expand because of its contacts with an adjacent cell. Such a design increases the pressures within the fluid chambers, by approximately a factor of 2, in order to reduce the optical path length. This and similar designs can work satisfactorily, provided that the assembly meets the criteria outlined above for overall stiffness and relative stiffness between display aperture and pressure relief regions. This may be assessed using standard engineering methods.

As the present invention is generally applicable to liquid crystal optical systems comprising a plurality of cells as well as various components, there will be variations and implementations of spacers and stiffeners and optical devices which will depend on the particular optical system being constructed. These may include thicknesses, fluids, materials, and types of components which were not specifically described, but which are consistent with the invention as taught, and which substitution would be apparent to an opto-mechanical engineer or a scientist skilled in the design of such systems.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A pressure tolerant liquid crystal device comprising:
   a first unitary substrate and a second unitary substrate spaced from said first unitary substrate:
   a display aperture portion having a predetermined display aperture geometry and volume, said display aperture volume being defined on one side by said first unitary substrate and on the other side by said second unitary substrate;
   an adaptive portion in fluid communication with said display aperture portion and having an adaptive portion geometry and volume, said adaptive portion volume being defined on one side by said first unitary substrate and an the other side by said second unitary substrate, said adaptive portion and said display aperture portion containing within each respective portion's volume a liquid crystal material subject to volumetric variance; and
   an element restraining said display aperture portion such that volumetric variance of said liquid crystal material results in substantially no change in said predetermined display aperture geometry and volume, said adaptive portion being sufficiently free of said restraining element so that said adaptive portion geometry and volume varies in response to said volumetric variance of said liquid crystal material and transfers liquid crystal material through said fluid communication path, thereby relieving pressure exerted by said volumetric variance of said liquid crystal material within said display aperture portion, at least one of said first and said second unitary substrates being yieldable to said pressure exerted by said liquid crystal volumetric variance.

2. The device of claim 1, said display aperture volume being further defined by a first predeterminately shaped means for maintaining said first and second display aperture sides in spaced relation, said adaptive portion volume being further defined by a second predeterminately shaped means for maintaining said first and said second adaptive portion sides in spaced apart relation, said first and said second shaped means having a fluid communication path therebetween so as to enable said fluid communication between said display aperture portion and said adaptive portion.

3. The device of claim 1, wherein said restraining element comprises a first retraining member mounted to said one side of said first display aperture portion and second restraining member mounted to said the other side of said display aperture portion.

4. The device of claim 3, further comprising means, mounted to said display aperture portion, for preventing contact between said adaptive portion and said restraining element as said adaptive portion geometry and volume varies.

5. The device of claim 3, wherein said first restraining member is further mounted to said one side of said first adaptive portion.

6. The device of claim 5, wherein said first substrate is substantially unyielding substrate and forms said first restraining member.

7. The device of claim 3, further comprising a plurality of said devices arranged in optical alignment and separated by means for spacing apart said plural devices.

8. The device of claim 3, wherein said display aperture portion is mounted in optical alignment with an optical device selected from a group of optical devices consisting of an optically transparent window, an optical retarder, a liquid crystal device, and an optical polarizer.

9. The device of claim 8, wherein said restraining element is said optical device.

10. The device of claim 4, wherein said display aperture portion is mounted in optical alignment with an optical device selected from a group of optical devices consisting of an optically transparent window, an optical retarder, a liquid crystal device, and an optical polarizer.

11. The device of claim 10, wherein said contact preventing means is said optical device.

12. The device of claim 7 wherein said device spacing means comprises an optical device selected from a group of optical devices consisting of an optically transparent window, an optical retarder, a liquid crystal device, and an optical polarizer.

13. The device of claim 7, wherein said plurality of said devices comprises a first outermost device and a second outermost device, each of said first and said second outermost devices having an outermost display aperture portion side, said each outermost display aperture portion side having a rigid outermost member mounted thereto, said restraining element comprising said mounted rigid outermost members and said device spacing means.

14. The device of claim 7, wherein said plurality of said devices comprises a first outermost device and a second outermost device, each of said first and said second outermost devices having an outermost display aperture portion side and an outermost adaptive portion side, each of said outermost display aperture portion sides and said outermost adaptive portion sides having a rigid outermost member mounted thereto, said restraining element comprising said mounted rigid outermost members and said device spacing means.

15. The device of claim 13, wherein said device spacing means comprises an optical device selected from a group of optical devices consisting of an optically transparent window, an optical retarder, a liquid crystal device, and an optical polarizer.

16. The device of claim 14, wherein said device spacing means comprises an optical device selected from a group of optical devices consisting of an optically transparent window, an optical retarder, a liquid crystal device, and an optical polarizer.

17. The device of claim 1 wherein said display aperture portion volume is larger than said adaptive portion volume.

18. The device of claim 1 wherein said display aperture portion volume is equal to said adaptive portion volume.

* * * * *